(12) United States Patent
Nguyen et al.

(10) Patent No.: US 11,308,669 B1
(45) Date of Patent: Apr. 19, 2022

(54) SHADER FOR GRAPHICAL OBJECTS

(71) Applicant: Apple Inc., Cupertino, CA (US)

(72) Inventors: Shem Nguyen, Oakland, CA (US); Austin Caleb Germer, Novato, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/007,673

(22) Filed: Aug. 31, 2020

Related U.S. Application Data

(60) Provisional application No. 62/906,797, filed on Sep. 27, 2019.

(51) Int. Cl.
  *G06T 11/40* (2006.01)
  *G06T 7/507* (2017.01)
  *G06T 11/00* (2006.01)

(52) U.S. Cl.
  CPC ............. *G06T 11/40* (2013.01); *G06T 7/507* (2017.01); *G06T 11/001* (2013.01); *G06T 2207/20084* (2013.01)

(58) Field of Classification Search
  CPC ....... G06T 11/40; G06T 7/507; G06T 11/001; G06T 2207/20084; G06T 7/586
  See application file for complete search history.

(56) References Cited

U.S. PATENT DOCUMENTS

| 9,495,581 B2* | 11/2016 | Winnemoeller ...... G06T 11/001 |
| 9,824,495 B2 | 11/2017 | Hagbi et al. |
| 2014/0344762 A1 | 11/2014 | Grasset et al. |
| 2018/0165798 A1* | 6/2018 | Lin .................. G06K 9/6267 |
| 2019/0304172 A1* | 10/2019 | Ha .................... G06T 15/40 |

FOREIGN PATENT DOCUMENTS

WO  2018/002910 A1  1/2018

\* cited by examiner

*Primary Examiner* — Antonio A Caschera
(74) *Attorney, Agent, or Firm* — Fernando & Partners, LLP

(57) ABSTRACT

A device includes a non-transitory memory and one or more processors coupled with the non-transitory memory. The device performs a method that includes detecting, in a set of one or more images, appearance features that define an appearance of an object represented in the set of one or more images. The appearance includes one or more shading effects associated with the object. The method includes generating a feature map for the object that encodes the detected appearance features of the object. The method includes displaying, based on the feature map, a computer-generated graphical object with one or more simulated shading effects that are within a degree of similarity to the one or more shading effects associated with the object.

26 Claims, 10 Drawing Sheets

| Displaying the graphical object includes performing deferred neural rendering in order to display the graphical object | —408 |

| Providing the feature map as an input to a deferred neural renderer that generates the simulated shading effects | —410 |

| Deferred neural renderer includes an object-specific deferred neural renderer | —412 |

| Deferred neural renderer includes a generalized deferred neural renderer | —414 |

| Varying a simulated light source in order to generate the simulated shading effect(s) | —415 |

| Change a direction of the simulated light source | —416 |

| Change an intensity of the simulated light source | —418 |

| Change a color of the simulated light source | —420 |

| Change a type of the simulated light source | —422 |

Figure 4B

| | |
|---|---|
| Types of simulated light sources include ambient, directional, point light, spotlight, area light and volumetric light sources | —424 |
| Appearance features indicate texture(s) of the object | —426 |
| Appearance features include neural textures that are detected by a neural network system | —428 |
| Providing the images to a machine-learned model that extracts the appearance features from the images | —430 |
| Applying a constant sampling rate to an image | —432 |
| Varying a sampling rate across an image based on a depth associated with the pixels | —434 |
| Feature map includes a neural texture map | —436 |
| Determining texel-to-pixel mappings and detecting the features based on the texel-to-pixel mappings | —438 |
| Simulated shading effects include simulated shadowing, hatching, smoothing and/or stippling | —440 |
| Object in the images is 2D and graphical object is 3D | —442 |

Figure 4C

SHADER FOR GRAPHICAL OBJECTS

CROSS REFERENCE TO RELATED APPLICATIONS

This application claims priority to U.S. patent application No. 62/906,797, filed on Sep. 27, 2019, which is hereby incorporated by reference in its entirety.

TECHNICAL FIELD

The present disclosure generally relates to graphics shaders.

BACKGROUND

Providing a shading effect is resource intensive. For example, content creators manually draw a shading effect onto a two-dimensional representation of an object. Manually-drawn shading effects tend to be inconsistent across different instances of a shading effect thereby detracting from a user experience.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 4A-4C are flowchart representations of a method of generating simulated shading effects in accordance with some implementations.

Figure 1:
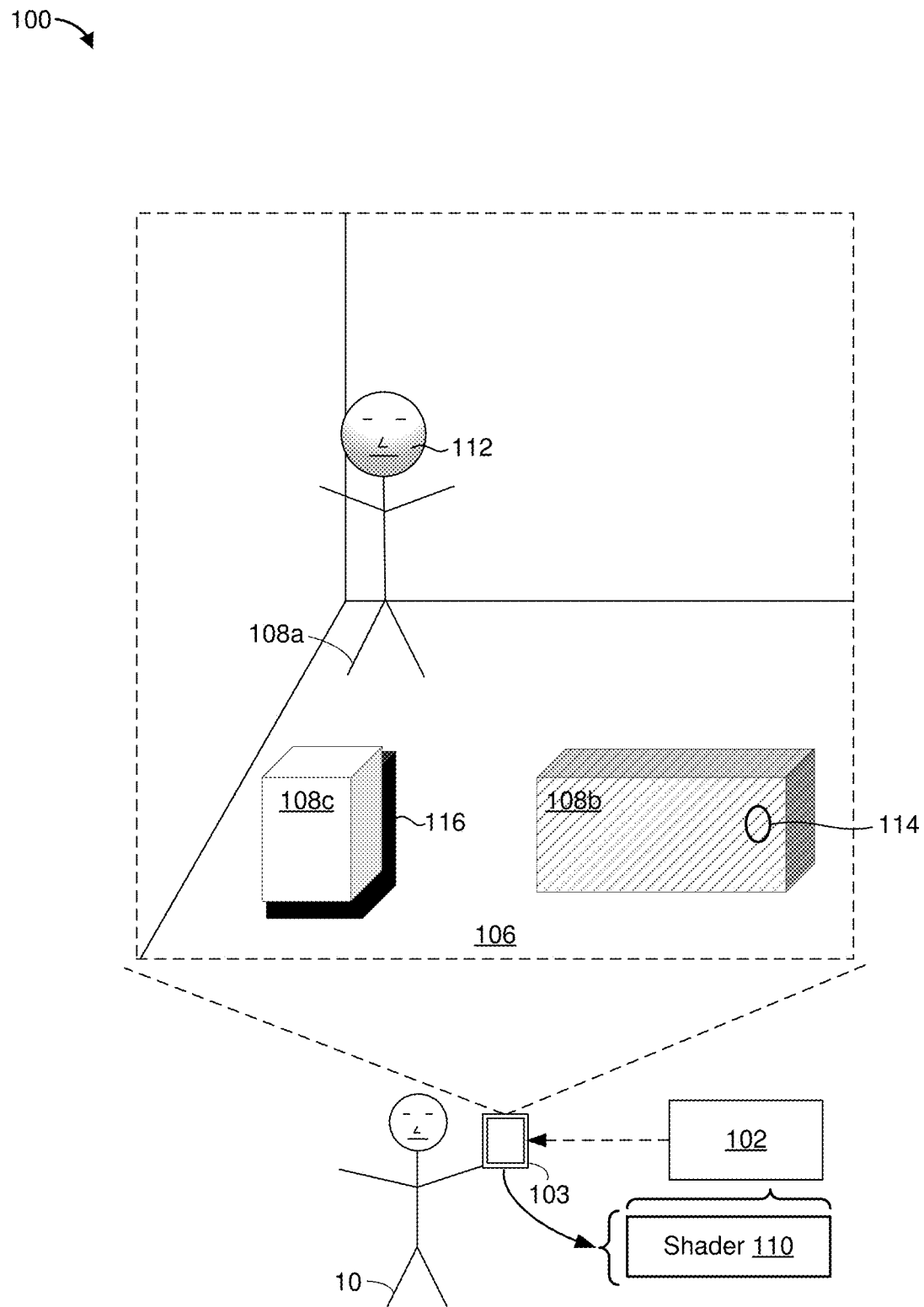
FIG. 1 is a diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for shading computer-generated graphical objects. In various implementations, a device includes a non-transitory memory and one or more processors coupled with the non-transitory memory. In some implementations, the method includes detecting, in a set of one or more images, appearance features that define an appearance of an object represented in the set of one or more images. In some implementations, the appearance includes one or more shading effects associated with the object. In some implementations, the method includes generating a feature map for the object that encodes the detected appearance features of the object. In some implementations, the method includes displaying, based on the feature map, a computer-generated graphical object with one or more simulated shading effects that are within a degree of similarity to the one or more shading effects associated with the object.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The present disclosure provides methods, systems, and/or devices for rendering computer-generated graphical objects with simulated shading effects that are within a degree of similarity to (e.g., within a similarity threshold of) shading effects in human-curated images. For example, the simulated shading effects are within a degree of similarity to shading effects that appear in sketches created by a human artist. The present disclosure allows detecting appearance features that define an appearance of an object represented in a set of images. The appearance includes shading effects associated with the object. The appearance features are encoded in a feature map. The feature map is utilized to display a computer-generated graphical object with simulated shading effects that are within a degree of similarity to the shading effects associated with the object. In various implementations, the present disclosure provides methods, systems, and/or devices that provide direct, non-mathematical artistic control of shading for computer-generated graphical objects.

In various implementations, displaying graphical objects with simulated shading effects that are similar to shading effects depicted in images reduces the need for user inputs that correspond to manually drawing the shading effects on the graphical objects. In some implementations, reducing unnecessary user inputs tends to reduce utilization of computing resources associated with interpreting and acting upon user inputs. In some implementations, reducing the utilization of computing resources enhances operability of the device by reducing heat generation. In some implementations, reducing the utilization of computing resources prolongs a battery-life of a battery-operated device thereby allowing the user to use the device for a longer duration. In some implementations, generating the simulated shading effects allows different instances of the graphical objects to have a consistent appearance thereby enhancing a user experience provided by the device.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 102 and an electronic device 103. In the example of FIG. 1, the electronic device 103 is being held by a user 10. In some implementations, the electronic device 103 includes a smartphone, a tablet, a laptop, or the like.

As illustrated in FIG. 1, the electronic device 103 presents a computer-generated graphical experience that includes displaying a portion of a CGR environment 106 (e.g., a computer-generated graphical environment). In some implementations, the CGR environment 106 is generated by the controller 102 and/or the electronic device 103. In some implementations, the CGR environment 106 includes a virtual environment that is a simulated replacement of a physical environment. In other words, in some implementations, the CGR environment 106 is synthesized by the controller 102 and/or the electronic device 103. In such implementations, the CGR environment 106 is different from a physical environment where the electronic device 103 is located. In some implementations, the CGR environment 106 includes an augmented environment that is a modified version of a physical environment. For example, in some implementations, the controller 102 and/or the electronic device 103 modify (e.g., augment) the physical environment where the electronic device 103 is located in order to generate the CGR environment 106. In some implementations, the controller 102 and/or the electronic device 103 generate the CGR environment 106 by simulating a replica of the physical environment where the electronic device 103 is located. In some implementations, the controller 102 and/or the electronic device 103 generate the CGR environment 106 by removing and/or adding items from the simulated replica of the physical environment where the electronic device 103 is located.

In the example of FIG. 1, the CGR environment 106 includes a first CGR object 108a, a second CGR object 108b and a third CGR object 108c. In some implementations, the first CGR object 108a is a CGR representation of the user 10. For example, the first CGR object 108a is an avatar of the user 10. In some implementations, the second CGR object 108b and the third CGR object 108c are CGR representations of physical articles that are found in a physical environment. For example, in some implementations, the second CGR object 108b is a CGR couch and the third CGR object 108c is a CGR speaker.

In various implementations, the controller 102 and/or the electronic device 103 include a CGR shader 110 that provides simulated shading effects for the CGR objects 108a, 108b and 108c. In the example of FIG. 1, the CGR shader 110 displays CGR smudging 112 (e.g., simulated smudging) on a face of the first CGR object 108a (e.g., in order to simulate facial hair, for example, a beard). The CGR shader 110 displays CGR hatching 114 (e.g., simulated hatching) on the second CGR object 108b (e.g., in order to simulate a texture). The CGR shader 110 displays a CGR shadow 116 (e.g., a simulated shadow) for the third CGR object 108c. In various implementations, the simulated shading effects generated by the CGR shader 110 are within a degree of similarity to shading effects that appear in a set of images (e.g., in a set of human-curated sketches).

In some implementations, the electronic device 103 is replaced by a head-mountable device (HMD) that can be worn by the user 10. In various implementations, the HMD operates in substantially the same manner as the electronic device 103 shown in FIG. 1. In some implementations, the HMD performs substantially the same operations as the electronic device 103 shown in FIG. 1. In some implementations, the HMD includes a head-mountable enclosure. In some implementations, the head-mountable enclosure is shaped to form a receptacle for receiving an electronic device with a display (e.g., the electronic device 103 shown in FIG. 1). For example, in some implementations, the electronic device 103 shown in FIG. 1 can be slid into the HMD. In some implementations, the HMD includes an integrated display for presenting a CGR experience to the user 10. In some implementations, the controller 102 and/or the HMD include the CGR environment 106 and/or the CGR shader 110.

Figure 2:
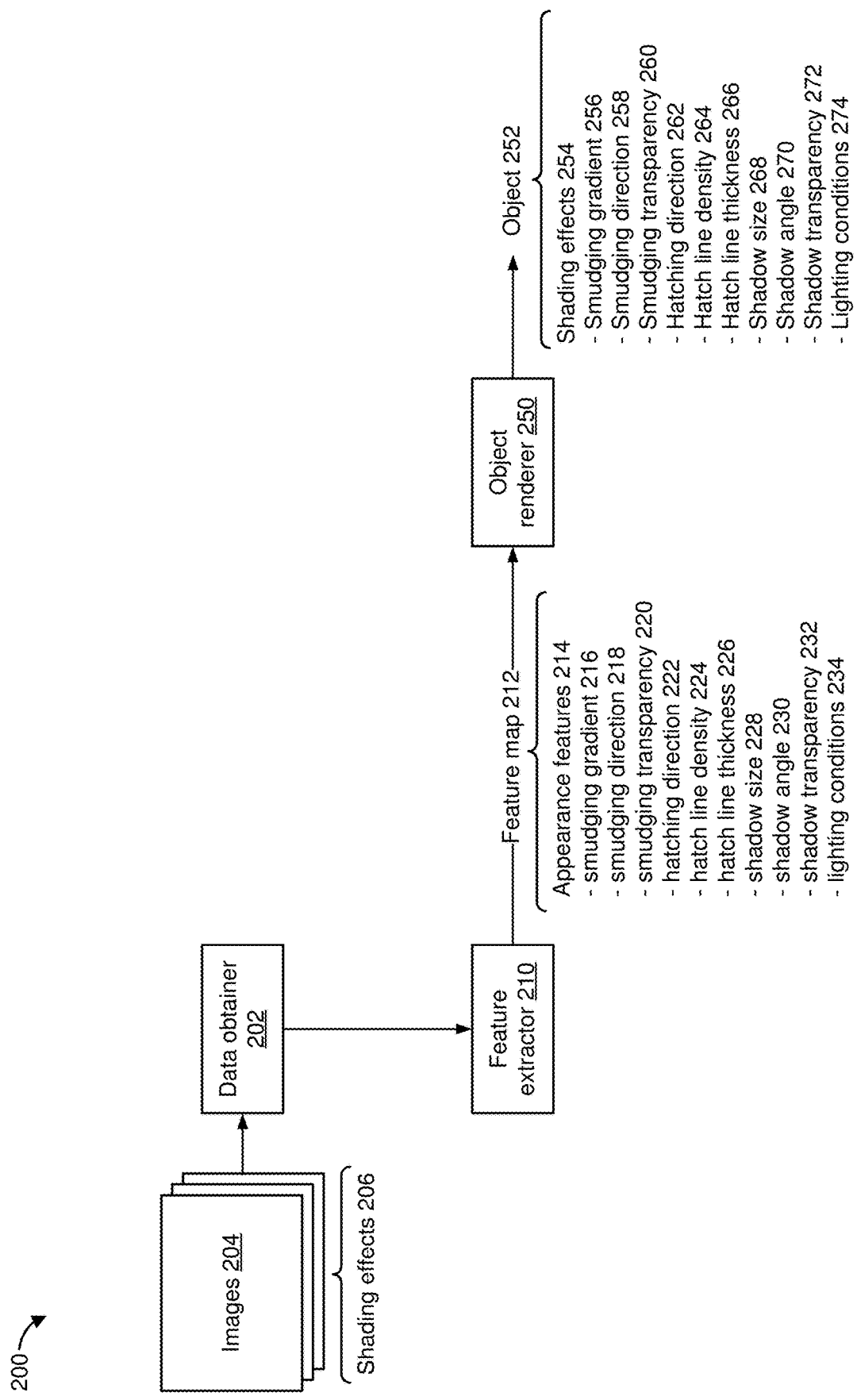
FIG. 2 is a block diagram of an example system for generating simulated shading effects in accordance with some implementations.

FIG. 2 is a block diagram of an example system 200 for generating simulated shading effects in accordance with some implementations. For example, in some implementations, the system 200 generates the CGR smudging 112, the CGR hatching 114 and/or the CGR shadow 116 shown in FIG. 1. In some implementations, the system 200 is implemented by the controller 102, the electronic device 103, and/or the CGR shader 110 shown in FIG. 1. To that end, the system 200 includes a data obtainer 202, a feature extractor 210 and a CGR object renderer 250.

In various implementations, the data obtainer 202 obtains a set of one or more images 204 ("images 204", hereinafter for the sake of brevity). In some implementations, the images 204 include human-curated sketches (e.g., drawings, cartoons and/or caricatures) of various objects (e.g., physical articles and/or persons). In some implementations, the images 204 are created by a single entity (e.g., by a single human, for example, by the same artist). In some implementations, the images 204 correspond to an entity indicated by a user input. For example, the data obtainer 202 obtains sketches created by an artist that the user 10 has specified. In some implementations, the images 204 are created by different entities (e.g., by different humans, for example, by different artists). In some implementations, the images 204 are captured by an operator via an image sensor. In some implementations, the images 204 are captured by a particular operator (e.g., by a particular photographer). In some implementations, the images 204 are from a literary work (e.g., a comic, a book, a movie, a magazine and/or an article). In various implementations, the images 204 include one or more shading effects 206 ("shading effects 206", hereinafter for the sake of brevity). In some implementations, the shading effects 206 include shadowing, hatching (e.g., crosshatching and/or liner hatching), smoothing (e.g., blending and/or smudging), and/or stippling. In some implementations, the data obtainer 202 provides the images 204 to the feature extractor 210.

In various implementations, the feature extractor 210 extracts one or more appearance features 214 ("appearance features 214", hereinafter for the sake of brevity) from the images 204. The appearance features 214 define an appearance of one or more objects represented in the images 204. In some implementations, the feature extractor 210 encodes the appearance features 214 as a feature map 212. As such, in some implementations, the feature map 212 indicates the appearance features 214 extracted by the feature extractor 210.

In various implementations, the appearance features 214 include values that define (e.g., parameterize) the shading effects 206 in the images 204. In some implementations, the appearance features 214 include a smudging gradient value 216 that indicates a gradient of smudges in the images 204. In some implementations, the appearance features 214 include a smudging direction value 218 that indicates a direction of smudges in the images 204. In some implementations, the appearance features 214 include a smudging transparency value 220 that indicates a level of transparency for smudges in the images 204.

In some implementations, the appearance features 214 include a hatching direction value 222 that indicates a direction of hatch lines in the images 204. In some implementations, the appearance features 214 include a hatch line density value 224 that indicates a density of the hatch lines in the images 204. In some implementations, the appearance features 214 include a hatch line thickness value 226 that indicates a thickness of the hatch lines in the images 204.

In some implementations, the appearance features 214 include a shadow size value 228 that indicates a size of a shadow in relation to a size of an object that the shadow is shadowing (e.g., as a percentage). In some implementations, the appearance features 214 include a shadow angle value 230 that indicates an angle of the shadow in relation to the object that the shadow is shadowing. In some implementations, the appearance features 214 include a shadow transparency value 232 that indicates a transparency level of the shadows in the images 204.

In some implementations, the appearance features 214 include one or more lighting condition values 234 that indicate physical lighting conditions in a physical environment where the images 204 were generated when the images 204 were generated (e.g., captured or hand-drawn). In some implementations, the lighting condition values 234 indicate an ambient lighting level in the physical environment where the images 204 were generated. In some implementations, the lighting condition values 234 indicate a type of light source that was used during the generation of the images 204. For example, the lighting condition values 234 indicate whether one or more of an ambient light source, a directional light source, a point light source, a spotlight, an area light source and a volumetric light source were used during the generation of the images 204. In some implementations, the lighting condition values 234 indicate a direction of light, an intensity of light and/or a color of light that was used during the generation of the images 204.

In some implementations, the feature extractor 210 includes a machine-learned model that has been trained to extract the appearance features 214 from the images 204. In some implementations, the machine-learned model is trained with labeled training data. In some implementations, the feature extractor 210 includes a neural network system. In such implementations, the appearance features 214 are referred to as neural features, for example, because the appearance features 214 are determined by the neural network system. In some implementations, the neural network system is trained using reinforcement learning. In some implementations, the appearance features 214 indicate one or more textures of objects represented in the images 204. In some implementations, the appearance features 214 are extracted by a neural network system, and the textures are referred to as neural textures. In such implementations, the feature map 212 is referred to as a neural texture map, for example, because the feature map 212 is generated by a neural network system. In some implementations, the neural network system includes one or more neural networks (e.g., one or more convolutional neural networks (CNNs)).

In various implementations, the CGR object renderer 250 renders a CGR object 252 (e.g., a computer-generated graphical object) based on the feature map 212. In some implementations, the CGR object 252 includes CGR shading effects 254 (e.g., simulated shading effects) that are within a degree of similarity to the shading effects 206 in the images 204. In some implementations, the CGR object renderer 250 renders the first CGR object 108a with the CGR smudging 112, the second CGR object 108b with the CGR hatching 114 and the third CGR object 108c with the CGR shadow 116 shown in FIG. 1.

In some implementations, the CGR shading effects 254 include CGR smudging (e.g., the CGR smudging 112 shown in FIG. 1) that is performed in accordance with a CGR smudging gradient value 256, a CGR smudging direction value 258 and/or a CGR smudging transparency value 260.

In some implementations, the CGR smudging gradient value 256 indicates a gradient of CGR smudges (e.g., a gradient of the CGR smudging 112 shown in FIG. 1). In some implementations, the CGR object renderer 250 determines the CGR smudging gradient value 256 based on the feature map 212 (e.g., based on the smudging gradient value 216). In some implementations, the CGR smudging gradient value 256 is within a degree of similarity to (e.g., matches) the smudging gradient value 216.

In some implementations, the CGR smudging direction value 258 indicates a direction of CGR smudges (e.g., a direction of the CGR smudging 112 shown in FIG. 1). In some implementations, the CGR object renderer 250 determines the CGR smudging direction value 258 based on the feature map 212 (e.g., based on the smudging direction value 218). In some implementations, the CGR smudging direction value 258 is within a degree of similarity to (e.g., matches) the smudging direction value 218.

In some implementations, the CGR smudging transparency value 260 indicates a level of transparency for CGR smudges (e.g., a level of transparency for the CGR smudging 112 shown in FIG. 1). In some implementations, the CGR object renderer 250 determines the CGR smudging transparency value 260 based on the feature map 212 (e.g., based on the smudging transparency value 220). In some implementations, the CGR smudging transparency value 260 is within a degree of similarity to the smudging transparency value 220.

In various implementations, the CGR smudging generated by the CGR object renderer 250 is within a degree of similarity to (e.g., within a similarity threshold of, for example, matches) smudging included in the shading effects 206, for example, because the CGR smudging gradient value 256, the CGR smudging direction value 258 and the CGR smudging transparency value 260 are within a degree of similarity to the smudging gradient value 216, the smudging direction value 218 and the smudging transparency value 220, respectively.

In some implementations, the CGR shading effects 254 include CGR hatching (e.g., the CGR hatching 114 shown in FIG. 1) that is performed in accordance with a CGR hatching direction value 262, a CGR hatch line density value 264 and/or a CGR hatch line thickness value 266. In various implementations, the CGR hatching includes CGR cross hatching and/or CGR line hatching.

In some implementations, the CGR hatching direction value 262 indicates a direction of hatch lines in CGR hatching (e.g., a direction of hatch lines in the CGR hatching 114 shown in FIG. 1). In some implementations, the CGR object renderer 250 determines the CGR hatching direction value 262 based on the feature map 212 (e.g., based on the hatching direction value 222). In some implementations, the CGR hatching direction value 262 is within a degree of similarity to the hatching direction value 222.

In some implementations, the CGR hatch line density value 264 indicates a density of the hatch lines in CGR hatching (e.g., a density of hatch lines in the CGR hatching 114 shown in FIG. 1). In some implementations, the CGR object renderer 250 determines the CGR hatch line density value 264 based on the feature map 212 (e.g., based on the hatch line density value 224). In some implementations, the CGR hatch line density value 264 is within a degree of similarity to the hatch line density value 224.

In some implementations, the CGR hatch line thickness value 266 indicates a thickness of the hatch lines in CGR hatching (e.g., a thickness of hatch lines in the CGR hatching 114 shown in FIG. 1). In some implementations, the CGR object renderer 250 determines the CGR hatch line thickness value 266 based on the feature map 212 (e.g., based on the hatch line thickness value 226). In some implementations, the CGR hatch line thickness value 266 is within a degree of similarity to the hatch line thickness value 226.

In various implementations, the CGR hatching generated by the CGR object renderer 250 is within a degree of similarity to hatching included in the shading effects 206, for example, because the CGR hatching direction value 262, the CGR hatch line density value 264 and/or the CGR hatch line thickness value 266 are within a degree of similarity to the hatching direction value 222, the hatch line density value 224 and the hatch line thickness value 226, respectively.

In some implementations, the CGR shading effects 254 include CGR shadows (e.g., the CGR shadow 116 shown in FIG. 1) that are displayed in accordance with a CGR shadow size value 268, a CGR shadow angle value 270 and/or a CGR shadow transparency value 272.

In some implementations, the CGR shadow size value 268 indicates a size of a CGR shadow in relation to a size of a CGR object that the CGR shadow is shadowing (e.g., as a percentage of the CGR object). For example, the CGR shadow size value 268 affects a size of the CGR shadow 116 shown in FIG. 1. In some implementations, the CGR object renderer 250 determines the CGR shadow size value 268 based on the feature map 212 (e.g., based on the shadow size value 228). In some implementations, the CGR shadow size value 268 is within a degree of similarity to the shadow size value 228.

In some implementations, the CGR shadow angle value 270 indicates an angle of a CGR shadow in relation to a CGR object that the CGR shadow is shadowing (e.g., an angle of the CGR shadow 116 shown in FIG. 1). In some implementations, the CGR object renderer 250 determines the CGR shadow angle value 270 based on the feature map 212 (e.g., based on the shadow angle value 230). In some implementations, the CGR shadow angle value 270 is within a degree of similarity to the shadow angle value 230.

In some implementations, the CGR shadow transparency value 272 indicates a transparency level of a CGR shadow (e.g., a transparency level of the CGR shadow 116 shown in FIG. 1). In some implementations, the CGR object renderer 250 determines the CGR shadow transparency value 272 based on the feature map 212 (e.g., based on the shadow transparency value 232). In some implementations, the CGR shadow transparency value 272 is within a degree of similarity to the shadow transparency value 232.

In various implementations, the CGR shadows generated by the CGR object renderer 250 are within a degree of similarity to shadows included in the shading effects 206, for example, because the CGR shadow size value 268, the CGR shadow angle value 270 and/or the CGR shadow transparency value 272 are within a degree of similarity to the shadow size value 228, the shadow angle value 230 and the shadow transparency value 232, respectively.

In some implementations, the CGR shading effects 254 are a function of CGR lighting conditions 274. In some implementations, the CGR object renderer 250 controls one or more operating characteristics of a simulated light source (e.g., a CGR light source) in order to generate one or more of the CGR shading effects 254. In some implementations, the CGR object renderer 250 determines the CGR lighting conditions 274 based on the lighting condition values 234. For example, in some implementations, the CGR lighting conditions 274 are within a degree of similarity to lighting conditions indicated by the lighting condition values 234. In some implementations, the CGR lighting conditions 274 include a simulated ambient lighting level that is determined based on the ambient lighting level in the physical environment (e.g., the simulated ambient lighting level is set to within a degree of similarity of the ambient lighting level in the physical environment). In some implementations, the CGR lighting conditions 274 indicate a type of the simulated light source (e.g., a simulated ambient light source, a simulated directional light source, a simulated point light source, a simulated spotlight, a simulated area light source and/or a simulated volumetric light source). In some implementations, the type of the simulated light source is within a degree of similarity to the type of the light source indicated by the lighting condition values 234. In some implementations, the CGR lighting conditions 274 indicate a direction of the simulated light, an intensity of the simulated light and/or a color of the simulated light. In some implementations, the direction of the simulated light, the intensity of the simulated light and/or the color of the simulated light are based on the direction of light, the intensity of light and/or the color of light, respectively, indicated by the lighting condition values 234. For example, the direction of the simulated light, the intensity of the simulated light and/or the color of the simulated light are within a degree of similarity to the direction of light, the intensity of light and/or the color of light, respectively, indicated by the lighting condition values 234.

In various implementations, the CGR object renderer 250 utilizes deferred neural rendering to generate the CGR shading effects 254. In some implementations, the CGR object renderer 250 includes a deferred neural renderer that takes the feature map 212 as an input, and generates the CGR shading effects 254 as outputs. In some implementations, the CGR object renderer 250 includes an object-specific deferred neural renderer that generates the CGR shading effects 254 for CGR objects that are within a degree of similarity to (e.g., similar to) an object that the object-specific deferred neural renderer corresponds to. In some such implementations, the CGR object renderer 250 includes multiple object-specific deferred neural renderers. In some implementations, the CGR object renderer 250 includes a generalized deferred neural renderer that generates the CGR shading effects 254 for various CGR objects (e.g., for any CGR object, for example, for CGR objects that are beyond a degree of similarity to objects represented by the images 204).

In some implementations, the CGR object renderer 250 varies a simulated light source of a CGR environment in which the CGR object 252 is displayed in order to generate the CGR shading effects 254. In some implementations, the feature extractor 210 extracts lighting features (e.g., the lighting condition values 234) that estimate lighting conditions under which the images 204 were generated (e.g., created, sketched or drawn). For example, in some implementations, the lighting features indicate an ambient lighting level of a physical environment in which the images 204 were generated, a direction of light associated with the images 204, and/or a type of light source that was used when the images 204 were generated. In some implementations, the CGR object renderer 250 sets characteristics of the simulated light source to values that are within a degree of similarity to the lighting features. For example, the CGR object renderer 250 sets an intensity, a color and/or a direction of the simulated light source to values that are within a degree of similarity to the intensity, the color and/or the direction, respectively, indicated by the lighting features.

Figure 3A:
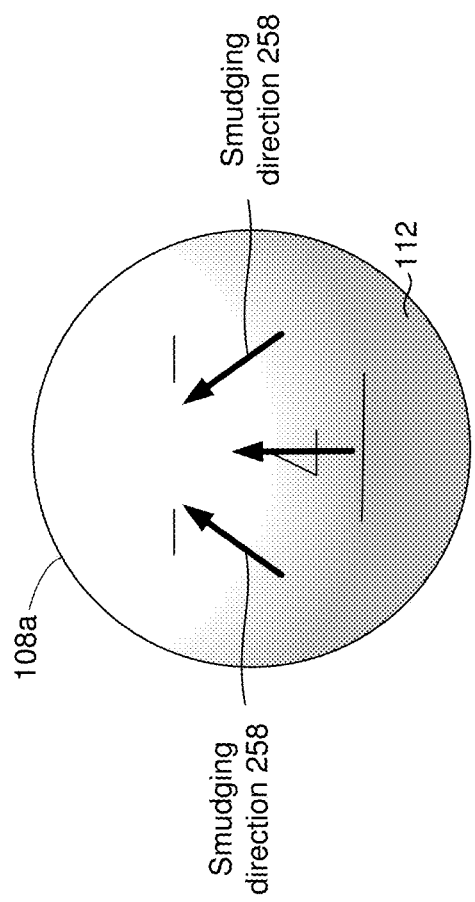
FIGS. 3A-3D are diagrams illustrating example simulated shading effects in accordance with some implementations.

FIG. 3A illustrates the CGR smudging direction value 258 in relation to the face of the first CGR object 108a. The arrows in FIG. 3A indicate the direction of the CGR smudging 112. In the example of FIG. 3A, the direction of the CGR smudging 112 is away from the bottom of the face and towards the top of the face. In this example, the CGR smudging 112 indicates facial hair (e.g., a beard). In some implementations, the images 204 are pictures of the user 10. In such implementations, the images 204 indicate an amount of facial hair of the user 10, and the CGR smudging gradient value 256, the CGR smudging direction value 258 and/or the CGR smudging transparency value 260 are determined based on the amount of facial hair of the user 10 (e.g., so that the CGR smudging 112 results in CGR facial hair that is within a degree of similarity to the physical facial hair of the user 10).

Figure 3B:
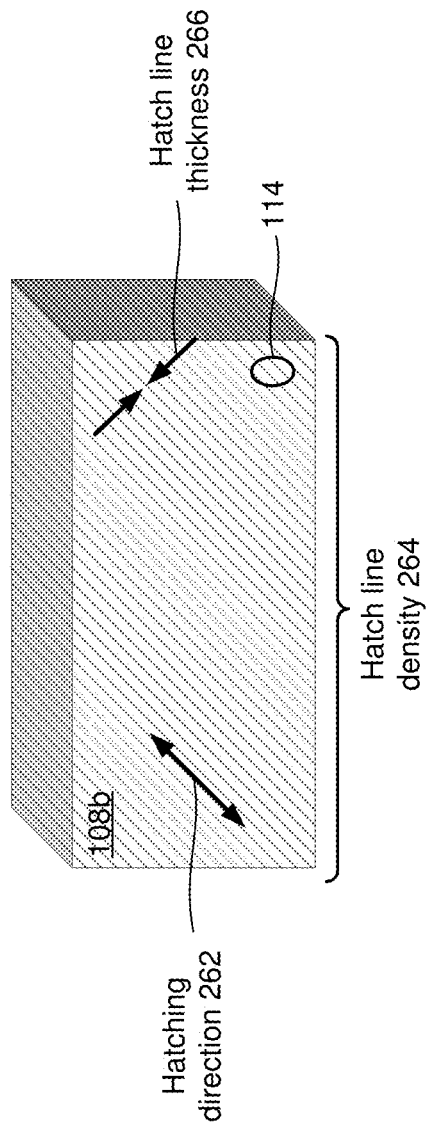

FIG. 3B illustrates the CGR hatching direction value 262, the CGR hatch line density value 264 and the CGR hatch line thickness value 266 in relation to the second CGR object 108b. As illustrated in FIG. 3B, hatch lines that form the CGR hatching 114 are in a direction that corresponds to the CGR hatching direction value 262. For example, the hatch lines that form the CGR hatching 114 extend from the bottom-left direction to the top-right direction. In the example of FIG. 3B, a number of hatch lines that form the CGR hatching 114 corresponds to the CGR hatch line density value 264. Similarly, a thickness of the hatch lines that form the CGR hatching 114 corresponds to (e.g., is equal to) the CGR hatch line thickness value 266.

Figure 3C:
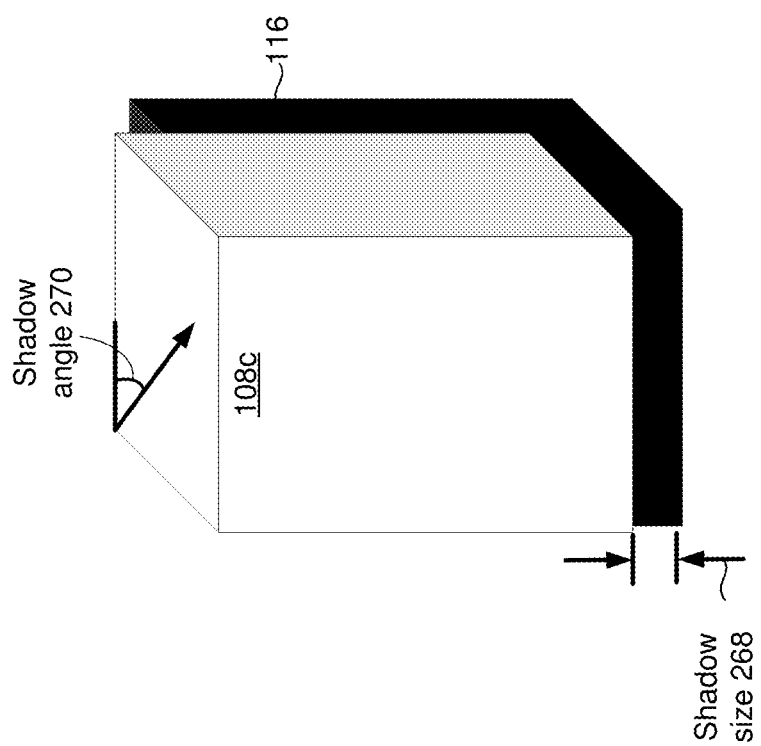

FIG. 3C illustrates the CGR shadow size value 268 and the CGR shadow angle value 270 in relation to the third CGR object 108c. As illustrated in FIG. 3C, a size of the CGR shadow 116 corresponds to the CGR shadow size value 268. Moreover, as shown in FIG. 3C, an angle of the CGR shadow 116 corresponds to the CGR shadow angle value 270. For example, a direction of the CGR shadow 116 is in the same direction indicated by the CGR shadow angle value 270.

Figure 3D:
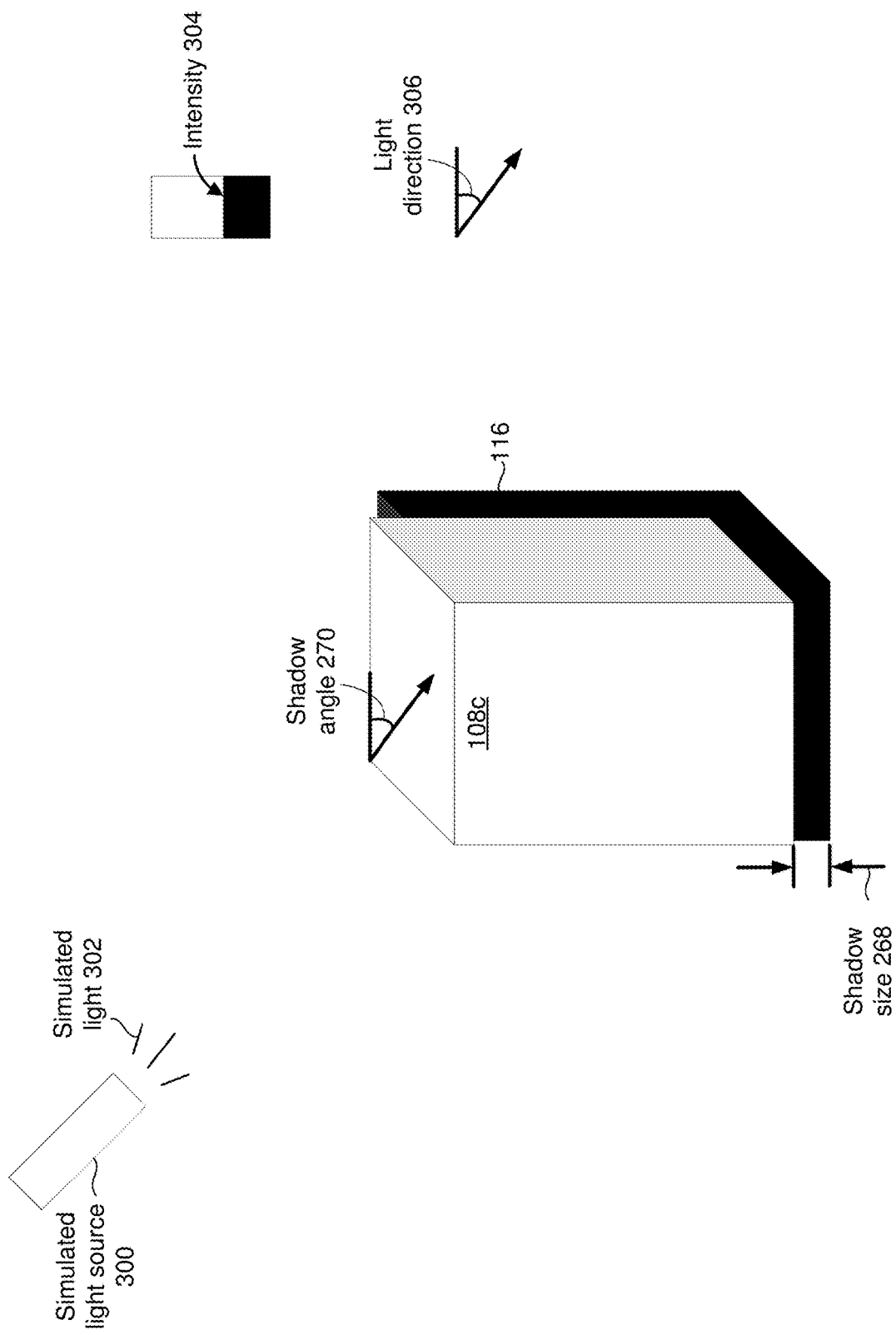

FIG. 3D illustrates a simulated light source 300 that emits simulated light 302. In various implementations, certain operating characteristics of the simulated light source 300 are varied in order to generate the CGR shading effects 254. In the example of FIG. 3D, certain operating characteristics of the simulated light source 300 are varied in order to generate the CGR shadow 116 for the third CGR object 108c in accordance with the CGR shadow size value 268 and the CGR shadow angle value 270. For example, in some implementations, an intensity 304 of the simulated light source 300 is selected based on the CGR shadow size value 268. For example, the intensity 304 of the simulated light source 300 is set in order to generate the CGR shadow 116 of a size that corresponds to the CGR shadow size value 268. In some implementations, a light direction 306 of the simulated light source 300 is selected based on the CGR shadow angle value 270. For example, the light direction 306 of the simulated light source 300 is set in order to generate the CGR shadow 116 at an angle that corresponds to the CGR shadow angle value 270.

Figure 4A:
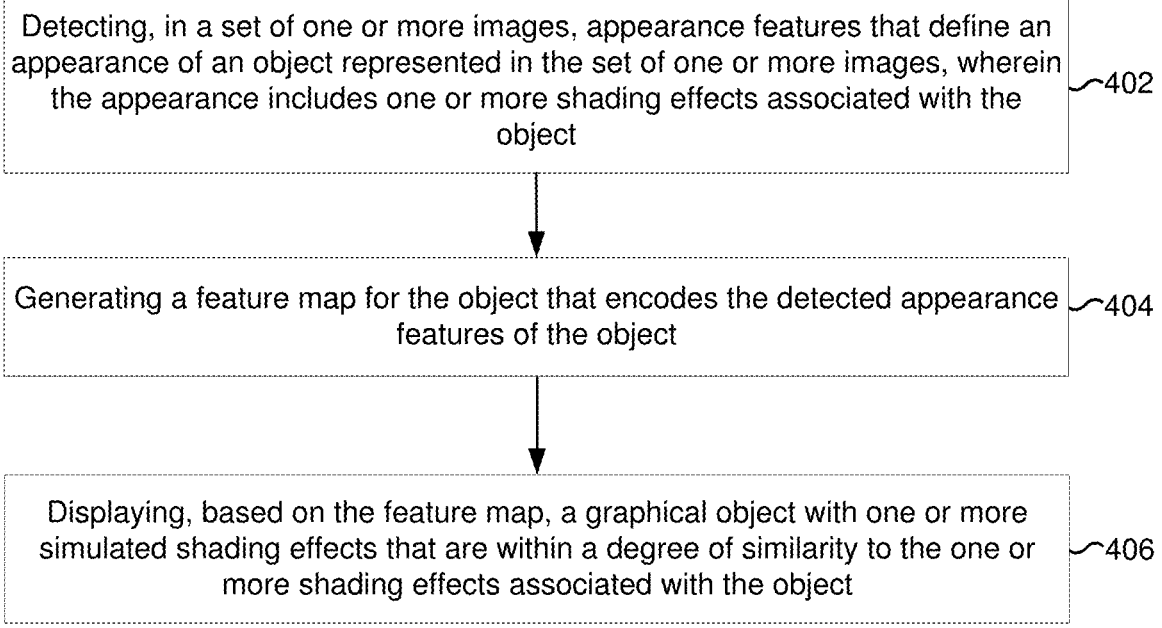

FIGS. 4A-4C are flowchart representations of a method 400 of generating simulated shading effects in accordance with some implementations. In various implementations, the method 400 is performed by a device with a non-transitory memory and one or more processors coupled with the non-transitory memory (e.g., the controller 102, the electronic device 103, and/or the CGR shades 110 shown in FIG. 1, and/or the system 200 shown in FIG. 2). In some implementations, the method 400 is performed by processing logic, including hardware, firmware, software, or a combination thereof. In some implementations, the method 400 is performed by a processor executing code stored in a non-transitory computer-readable medium (e.g., a memory).

As represented by block 402, in various implementations, the method 400 includes detecting, in a set of one or more images, appearance features that define an appearance of an object represented in the set of one or more images. For example, as shown in FIG. 2, the feature extractor 210 detects the appearance features 214 in the images 204. In some implementations, the appearance includes one or more shading effects associated with the object. For example, as shown in FIG. 2, the images 204 have shading effects 206.

As represented by block 404, in various implementations, the method 400 includes generating a feature map for the object that encodes the detected appearance features of the object. For example, as shown in FIG. 2, the feature extractor 210 generates the feature map 212. In some implementations, the feature map 212 encodes the appearance features 214 detected by the feature extractor 210.

As represented by block 406, in various implementations, the method 400 includes displaying, based on the feature map, a computer-generated graphical object (e.g., a CGR object) with one or more simulated shading effects that are within a degree of similarity to the one or more shading effects associated with the object. For example, as shown in FIG. 2, the CGR object renderer 250 displays the CGR object 252 with the CGR shading effects 254 based on the feature map 212. Moreover, as described in relation with FIG. 2, the CGR shading effects 254 are within a degree of similarity to the shading effects 206.

Referring to FIG. 4B, as represented by block 408, in some implementations, displaying the CGR object includes performing deferred neural rendering in order to display the CGR object. For example, as described in relation to FIG. 2, in some implementations, the CGR object renderer 250 performs deferred neural rendering in order to display the CGR object 252 (e.g., the first CGR object 108a, the second CGR object 108b and the third CGR object 108c shown in FIG. 1).

As represented by block 410, in some implementations, the method 400 includes providing the feature map as an input to a deferred neural renderer that generates the one or more simulated shading effects for the CGR object. For example, as shown in FIG. 2, the feature extractor 210 provides the feature map 212 to the CGR object renderer 250 as an input, and the CGR object renderer 250 generates the CGR shading effects 254 based on the feature map 212. As described in relation to FIG. 2, in some implementations, the CGR object renderer 250 includes a deferred neural renderer that generates the CGR shading effects 254 based on the feature map 212.

As represented by block 412, in some implementations, the deferred neural renderer includes an object-specific deferred neural renderer that generates simulated shading effects for CGR objects that are within a degree of similarity to the object. For example, as described in relation to FIG. 2, in some implementations, the CGR object renderer 250 includes an object-specific deferred neural renderer that generates the CGR shading effects 254 for CGR objects that are within a degree of similarity to an object represented in the images 204.

As represented by block 414, in some implementations, the deferred neural renderer includes a generalized deferred neural renderer that generates simulated shading effects for another CGR object that is beyond a degree of similarity to the object. For example, as described in relation to FIG. 2, in some implementations, the CGR object renderer 250 includes a generalized deferred neural renderer that generates the CGR shading effects 254 for a CGR object that is beyond a degree of similarity to the object(s) represented in the images 204.

As represented by block 415, in some implementations, the method 400 includes varying a simulated light source of a CGR environment in which the CGR object is displayed in order to generate the one or more simulated shading effects. For example, as shown in FIG. 3D, in some implementations, one or more operating characteristics of the simulated light source 300 are varied in order to generate the CGR shadow 116 for the third CGR object 108c. As another example, as illustrated in FIG. 2, in some implementations, the CGR object renderer 250 varies one or more operating characteristics of the simulated light source in accordance with the CGR lighting conditions 274.

As represented by block 416, in some implementations, varying the simulated light source includes changing a direction of the simulated light source in order to generate the one or more simulated shading effects. For example, as shown in FIG. 3D, in some implementations, the light direction 306 of the simulated light source 300 is changed in order to generate the CGR shadow 116 with an angle that corresponds to the CGR shadow angle value 270.

As represented by block 418, in some implementations, varying the simulated light source includes changing an intensity of the simulated light source in order to generate the one or more simulated shading effects. For example, as shown in FIG. 3D, in some implementations, the intensity 304 of the simulated light 302 is varied in order to generate the CGR shadow 116 for the third CGR object 108c.

As represented by block 420, in some implementations, varying the simulated light source includes changing a color of the simulated light source in order to generate the one or more simulated shading effects. For example, in some implementations, a color of the simulated light 302 is varied in order to generate the CGR shadow 116 for the third CGR object 108c.

As represented by block 422, in some implementations, varying the simulated light source includes changing a type of the simulated light source in order to generate the one or more simulated shading effects. For example, in some implementations, a type of the simulated light source 300 is varied in order to generate the CGR shadow 116 for the third CGR object 108c.

Referring to FIG. 4C, as represented by block 424, in some implementations, changing the type of the simulated light source includes switching between a simulated ambient light source, a simulated directional light source, a simulated point light source, a simulated spotlight light source, a simulated area light source and a simulated volumetric light source. In some implementations, the method 400 includes determining (e.g., estimating) a type of light source that was used in generating the images 204, and utilizing the same type of light source as the simulated light source. For example, if an ambient light source was used in generating the images 204, then a simulated ambient light source is used to generate the CGR shading effects.

As represented by block 426, in some implementations, the appearance features indicate one or more textures of the object. For example, as described in relation to FIG. 2, in some implementations, the appearance features 214 indicate one or more textures of an object represented in the images 204.

As represented by block 428, in some implementations, the appearance features include neural textures that are detected by a neural network system. For example, as described in relation to FIG. 2, in some implementations, the feature extractor 210 includes a neural network system that extracts the appearance features 214 from the images 204.

As represented by block 430, in some implementations, detecting the appearance features includes providing the set of one or more images as an input to a machine-learned model that extracts the appearance features from the set of one or more images. For example, as described in relation to FIG. 2, in some implementations, the feature extractor 210 includes a machine-learned model, the images 204 are provided to the machine-learned model as an input, and the machine-learned model generates the feature map 212.

As represented by block 432, in some implementations, detecting the appearance features includes applying a constant sampling rate to a first image in the set of one or more images. For example, with reference to FIG. 2, in some implementations, the feature extractor 210 applies a constant sampling rate throughout one of the images 204 in order to extract the appearance features 214 from the image.

As represented by block 434, in some implementations, detecting the appearance features comprises varying a sampling rate across a first image in the set of one or more images based on a depth associated with pixels in the first image. For example, with reference to FIG. 2, in some implementations, the feature extractor 210 applies different sampling rates across different portions of a particular image in the set of images 204. In some implementations, the method 400 includes applying a relatively lower sampling rate (e.g., a first sampling rate that is less than a threshold sampling rate) to pixels that represent a portion of an object that is proximate (e.g., to pixels associated with a first depth value that is less than a threshold depth value) in order to prevent oversampling, and applying a relatively higher sampling rate (e.g., a second sampling rate that is greater than the first sampling rate) to pixels that represent a portion of the object that is distant (e.g., to pixels associated with a second depth value that is greater than the first depth value) in order to avoid under sampling.

As represented by block 436, in some implementations, the appearance features include neural textures of the object, and the feature map includes a neural texture map of the object. For example, as described in relation to FIG. 2, in some implementations, the appearance features 214 indicate one or more textures that are extracted by a neural network system, and the feature map 212 that encodes the textures is generated by the neural network system.

As represented by block 438, in some implementations, the method 400 includes prior to detecting the appearance features, determining respective texel-to-pixel mappings (e.g., UV maps) for the images in the set of one or more images. For example, with reference to FIG. 2, in some implementations, the feature extractor 210 determines respective UV maps for the images 204. In some implementations, the method 400 includes detecting the appearance features based on the respective texel-to-pixel mappings. For example, with reference to FIG. 2, in some implementations, the feature extractor 210 detects the appearance features 214 based on the UV maps of the images 204.

As represented by block 440, in some implementations, the simulated shading effects include one or more of simulated shadowing (e.g., the CGR shadow 116 shown in FIG. 1), simulated hatching (e.g., the CGR hatching 114 shown in FIG. 1, for example, simulated crosshatching and/or simulated liner hatching), simulated smoothing (e.g., simulated blending and/or simulated smudging such as the CGR smudging 112 shown in FIG. 1), and simulated stippling.

As represented by block 442, in some implementations, the object in the set of one or more images includes a two-dimensional (2D) object. For example, the object represented in the images 204 (shown in FIG. 2) is a 2D object. In other words, the images 204 include a 2D representation of an object. As represented by block 442, in some implementations, the CGR object includes a three-dimensional (3D) object. For example, the first CGR object 108a, the second CGR object 108b and the third CGR object 108c are 3D objects.

Figure 5:
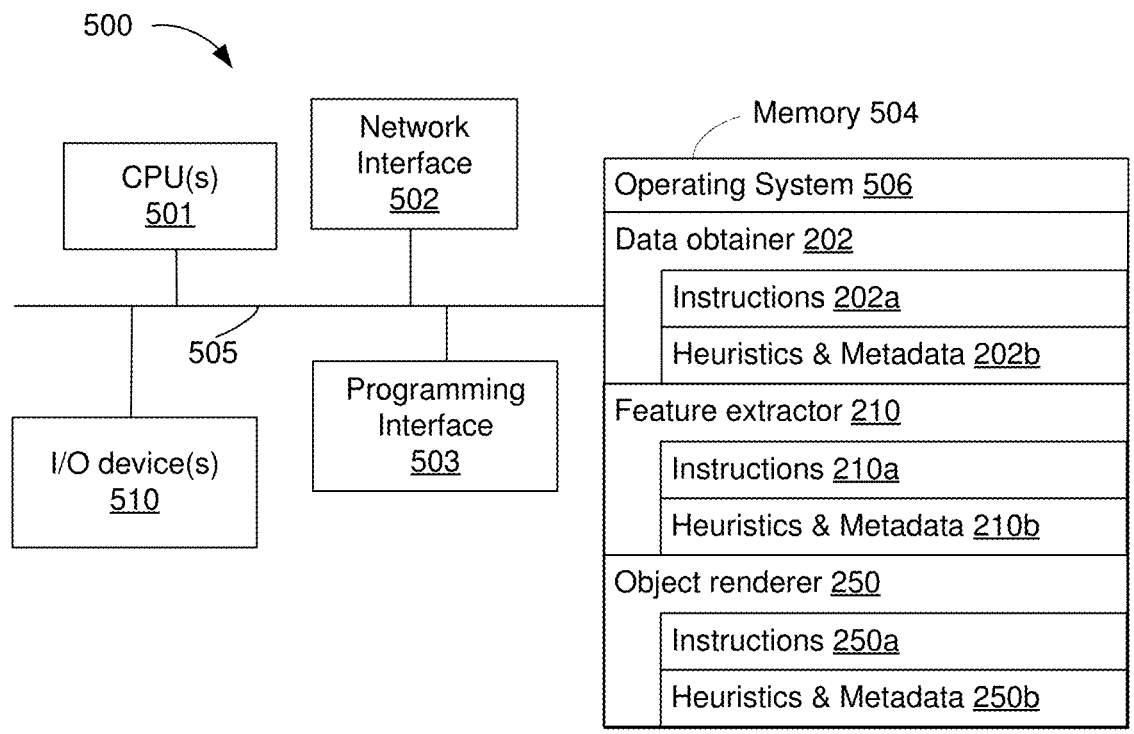
FIG. 5 is a block diagram of a device enabled with various components for generating simulated shading effects in accordance with some implementations.

FIG. 5 is a block diagram of a device 500 enabled with various components for controlling levels of content generation within a CGR environment in accordance with some implementations. In some implementations, the device 500 implements the controller 102, the electronic device 103, the CGR shades 110 and/or the system 200 shown in FIGS. 1 and 2. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 500 includes one or more processing units (CPUs) 501, a network interface 502, a programming interface 503, a memory 504, one or more input/output (I/O) devices 510, and one or more communication buses 505 for interconnecting these and various other components.

In some implementations, the network interface 502 is provided to, among other uses, establish and maintain a metadata tunnel between a cloud-hosted network management system and at least one private network including one or more compliant devices. In some implementations, the one or more communication buses 505 include circuitry that interconnects and controls communications between system components. The memory 504 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 504 optionally includes one or more storage devices remotely located from the one or more CPUs 501. The memory 504 comprises a non-transitory computer readable storage medium.

In some implementations, the memory 504 or the non-transitory computer readable storage medium of the memory 504 stores the following programs, modules and data structures, or a subset thereof including an optional operating system 506, the data obtainer 202, the feature extractor 210 and the CGR object renderer 250. In various implementations, the device 500 performs the method 400 shown in FIGS. 4A-4C.

In some implementations, the data obtainer 202 obtains a set of one or more images (e.g., the images 204 shown in FIG. 2). To that end, the data obtainer 202 includes instructions 202a, and heuristics and metadata 202b. As described herein, in some implementations, the feature extractor 210 extracts a set of one or more appearance features from the set of one or more images (e.g., the appearance features 214 shown in FIG. 2). To that end, the feature extractor 210 includes instructions 210a, and heuristics and metadata 210b. As described herein, in some implementations, the CGR object renderer 250 displays a CGR object with CGR shading effects in accordance with the appearance features. To that end, the CGR object renderer 250 includes instructions 250a, and heuristics and metadata 250b.

In some implementations, the one or more I/O devices 510 include a display for displaying a computer-generated graphical environment (e.g., the CGR environment 106 shown in FIG. 1). In some implementations, the display includes an optical see-through display.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a device including a display, a non-transitory memory and one or more processors coupled with the display and the non-transitory memory:
   detecting, in a set of one or more images, appearance features that define an appearance of an object represented in the set of one or more images, wherein the appearance includes one or more hand-drawn shading effects associated with the object;
   generating a feature map for the object that encodes the detected appearance features of the object; and
   displaying, based on the feature map, a computer-generated graphical environment including a computer-generated graphical object with one or more simulated shading effects that are generated by varying a simulated light source of the computer-generated graphical environment and the one or more simulated shading effects are within a degree of similarity to the one or more hand-drawn shading effects associated with the object.

2. The method of claim 1, wherein displaying the computer-generated graphical object comprises performing deferred neural rendering in order to display the computer-generated graphical object.

3. The method of claim 1, further comprising:
   providing the feature map as an input to a deferred neural renderer that generates the one or more simulated shading effects for the computer-generated graphical object.

4. The method of claim 3, wherein the deferred neural renderer includes an object-specific deferred neural renderer that generates simulated shading effects for computer-generated graphical objects that are within a degree of similarity to the object.

5. The method of claim 3, wherein the deferred neural renderer includes a generalized deferred neural renderer that generates simulated shading effects for another computer-generated graphical object that is beyond a degree of similarity to the object.

6. The method of claim 1, wherein varying the simulated light source includes changing a direction of the simulated light source in order to generate the one or more simulated shading effects.

7. The method of claim 1, wherein varying the simulated light source includes changing an intensity of the simulated light source in order to generate the one or more simulated shading effects.

8. The method of claim 1, wherein varying the simulated light source includes changing a color of the simulated light source in order to generate the one or more simulated shading effects.

9. The method of claim 1, wherein varying the simulated light source includes changing a type of the simulated light source in order to generate the one or more simulated shading effects.

10. The method of claim 9, wherein changing the type of the simulated light source includes switching between a simulated ambient light source, a simulated directional light source, a simulated point light source, a simulated spotlight light source, a simulated area light source and a simulated volumetric light source.

11. The method of claim 1, wherein the appearance features indicate one or more textures of the object.

12. The method of claim 1, wherein the appearance features include neural textures that are detected by a neural network system.

13. The method of claim 1, wherein detecting the appearance features includes providing the set of one or more images as an input to a machine-learned model that extracts the appearance features from the set of one or more images.

14. The method of claim 1, wherein detecting the appearance features comprises applying a constant sampling rate to a first image in the set of one or more images.

15. The method of claim 1, wherein detecting the appearance features comprises varying a sampling rate across a first image in the set of one or more images based on a depth associated with pixels in the first image.

16. The method of claim 1, wherein the appearance features include neural textures of the object, and the feature map includes a neural texture map of the object.

17. The method of claim 1, further comprising:
   determining respective texel-to-pixel mappings for the images in the set of one or more images; and
   detecting the appearance features based on the respective texel-to-pixel mappings.

18. The method of claim 1, wherein the one or more hand-drawn shading effects include hatching, smoothing or stippling that is associated with the object.

19. A device comprising:
   one or more processors;
   a non-transitory memory;
   one or more displays; and
   one or more programs stored in the non-transitory memory, which, when executed by the one or more processors, cause the device to:

detect, in a set of one or more images, appearance features that define an appearance of an object represented in the set of one or more images, wherein the appearance includes hatching, smoothing or stippling that is associated with the object and neural textures that are detected by a neural network system;

generate a feature map for the object that encodes the detected appearance features of the object; and display, based on the feature map, a computer-generated graphical object with simulated hatching that is within a degree of similarity to the hatching, simulated smoothing that is within a degree of similarity to the smoothing or simulated stippling that is within a degree of similarity to the stippling.

20. The device of claim 19, wherein the one or more simulated shading effects are generated by varying a simulated light source of a computer-generated graphical environment.

21. The device of claim 20, wherein varying the simulated light source comprises changing a direction of the simulated light source, changing an intensity of the simulated light source, changing a color of the simulated light source or changing a type of the simulated light source.

22. The device of claim 19, wherein displaying the computer-generated graphical object comprises performing deferred neural rendering in order to display the computer-generated graphical object.

23. A non-transitory memory storing one or more programs, which, when executed by one or more processors of a device with a display, cause the device to:

detect, in a set of one or more images, appearance features that define an appearance of an object represented in the set of one or more images, wherein the appearance includes hatching, smoothing or stippling that is associated with the object and neural textures that are detected by a neural network system;

generate a feature map for the object that encodes the detected appearance features of the object; and display, based on the feature map, a computer-generated graphical object with simulated hatching that is within a degree of similarity to the hatching, simulated smoothing that is within a degree of similarity to the smoothing or simulated stippling that is within a degree of similarity to the stippling.

24. The non-transitory memory of claim 23, wherein the one or more simulated shading effects are generated by varying a simulated light source of a computer-generated graphical environment.

25. The non-transitory memory of claim 24, wherein varying the simulated light source comprises changing a direction of the simulated light source, changing an intensity of the simulated light source, changing a color of the simulated light source or changing a type of the simulated light source.

26. The non-transitory memory of claim 23, wherein displaying the computer-generated graphical object comprises performing deferred neural rendering in order to display the computer-generated graphical object.

\* \* \* \* \*